United States Patent
Zeiringer et al.

(10) Patent No.: US 7,381,466 B2
(45) Date of Patent: Jun. 3, 2008

(54) ABRASIVE WITH IMPROVED ABRASIVE PROPERTIES COMPRISING A COATING OF COMPLEX OXIDE AND SILICATE BINDING AGENT

(75) Inventors: Hans Zeiringer, Kappel (AT); Thomas Wurzer, Velden (AT)

(73) Assignee: Treibacher Schleifmittel GmbH (DE)

( * ) Notice: Subject to any disclaimer, the term of this patent is extended or adjusted under 35 U.S.C. 154(b) by 0 days.

(21) Appl. No.: 10/537,966

(22) PCT Filed: Dec. 9, 2003

(86) PCT No.: PCT/EP03/13911

§ 371 (c)(1),
(2), (4) Date: Dec. 12, 2005

(87) PCT Pub. No.: WO2004/053013

PCT Pub. Date: Jun. 24, 2004

(65) Prior Publication Data

US 2006/0134421 A1   Jun. 22, 2006

(30) Foreign Application Priority Data

Dec. 10, 2002 (DE) ................ 102 57 554

(51) Int. Cl.
*B32B 5/16* (2006.01)
*B05D 3/02* (2006.01)
(52) U.S. Cl. .......... 428/403; 427/215; 427/372.2; 427/383.3; 427/397.7; 427/419.2; 427/419.3; 428/404
(58) Field of Classification Search ........ 428/403, 428/404; 427/212, 215, 219, 372.2, 383.3, 427/397.7, 419.1, 419.2, 419.3
See application file for complete search history.

(56) References Cited

U.S. PATENT DOCUMENTS

| | | | | |
|---|---|---|---|---|
| 4,593,007 A | * | 6/1986 | Novinski | 501/105 |
| 5,134,032 A | * | 7/1992 | Cooper et al. | 428/403 |
| 5,702,811 A | * | 12/1997 | Ho et al. | 428/323 |
| 6,258,141 B1 | | 7/2001 | Sung et al. | |
| 6,641,941 B2 | * | 11/2003 | Yamada et al. | 428/702 |
| 6,663,682 B2 | * | 12/2003 | Baldoni et al. | 51/307 |
| 6,835,455 B2 | * | 12/2004 | Tanaka et al. | 428/403 |

FOREIGN PATENT DOCUMENTS

| | | |
|---|---|---|
| EP | 0014236 | 8/1980 |
| EP | 0 532 261 A1 | 3/1993 |
| EP | PCT/EP03/13911 | 3/2005 |
| JP | 02097457 | 4/1990 |

OTHER PUBLICATIONS

Abstracts of Japan Publication No. 02269790 Publication date: Nov. 4, 1989 Applicant: Noritake Co., Ltd., Inventor: Hisada Eiichi Application No. 01089710.

* cited by examiner

*Primary Examiner*—H. T Le
(74) *Attorney, Agent, or Firm*—Connolly Bove Lodge & Hutz LLP

(57) ABSTRACT

Abrasive particles from the group of conventional abrasive particles, in particular fused or sintered corundums, zirconium corundums, silicon corundums, silicon carbides and boron carbide, for application in synthetic resin-bonded abrasives, characterized by the fact that on the surface they are provided with a coating consisting of 0.05 to 2.0 weight percent, relative to the weight of the untreated abrasive particle, of an aqueous binding agent on silicon basis and 0.05 to 5.0 weight percent, also relative to the weight of the untreated abrasive particle, of a complex, fine grained oxide compound of the general formula $A_xB_yO_z$, with A and B each being a group of elements and O being oxygen present in a stoichiometric ratio to A and B, and whereby the numbers x, y and z denote the composition of the complex oxides without being limited to whole numbers, and z corresponds to a product of the sum of (x+y) and a factor of between 1.5 and 2.5. The group of elements A concerns the group of metals in the periodic system of elements, while the group of elements B concerns the group of amphoteric elements in the periodic system. The complex, fine grained oxide compound $A_xB_yO_z$ contains at least one element each from the group of metals and one element from the group of amphoteric elements of the periodic system. The aqueous binder on silicon basis is preferably colloidal silicic acid. Method for the coating of the abrasive particles in which the coated abrasive particles are subjected to a heat treatment between 100 and 900° C.

14 Claims, No Drawings

ABRASIVE WITH IMPROVED ABRASIVE PROPERTIES COMPRISING A COATING OF COMPLEX OXIDE AND SILICATE BINDING AGENT

The invention at hand concerns abrasive particles from the group of conventional abrasive particles that comprises fused or sintered corundums, zirconium corundums, silicon corundums, silicon carbides and boron carbide for application in synthetic resin-bonded abrasives, with the abrasive particles being characterized by the fact that on the surface they are provided with a coating consisting of 0.05 to 2.0 weight percent, relative to the weight of the untreated abrasive particle; of an aqueous binding agent on silicon basis and 0.05 to 5.0 weight percent, also relative to the weight of the untreated abrasive particle, of a complex, fine grained oxide compound of the general formula $A_xB_yO_z$ in which A and B each are a group of elements and O is oxygen present in a stoichiometric ratio to A and B, and the numbers x, y and z denote the composition of the complex oxides and are not limited to whole numbers and z corresponds to a product of the sum of (x+y) and a factor of between 1.5 and 2.5. The group of elements A concerns the group of metals in the periodic system of elements, while the group of elements B concerns the group of amphoteric elements in the periodic system. The complex, fine grained oxide compound $A_xB_yO_z$ contains at least one element each from the group of metals or, respectively, from the group of amphoteric elements of the periodic system. The aqueous binder on silicon basis is preferably colloidal silicic acid. In addition, the invention at hand concerns a method for the production of the above-mentioned abrasive particles as well as their use in abrasives bonded by synthetic resins.

Abrasive particles are used in the most varied particle sizes in bonded and loose form for the most varied abrasive processes. For example, in a mixture together with ceramic masses or artificial resin, they are shaped into abrasive discs, with the ceramic masses or artificialieins resins serving as binder for the abrasive particle. In the case of abrasives on a backing (paper, linen cloth, etc.), adherence to the backing is realized, as a rule, by way of synthetic resin bonding. However, the efficiency of the various abrasives is not only influenced by the abrasive particles used, but to a high degree also by the bonding of the particles to the abrasive. In this respect, the interface between the abrasive particle and the binder phase is of particular significance. It determines the force required to break an abrasive particle from any bonding. The harder and more steadfast an abrasive particle is, the greater are the requirements of the bonding and the adhesive forces on the interfaces, and the easier it will be to break a particle out of its binding. Most abrasive particles, in particular those that are produced by a melting process, have a relatively smooth surface that proves to be disadvantageous for the bonding that relies primarily on adhesion. This holds true in particular for abrasives bonded by synthetic resins in which the binding is based almost exclusively on adhesion. Therefore, in the past, a large number of measures have been suggested to roughen up or, respectively, to enlarge the surface, thereby improving the binding.

U.S. Pat. Nos. 2,527,044 and 2,541,658, on which the invention is based, describe the treatment of conventional abrasive particles with an aqueous binding agent and fine grained oxides for the enlargement of the particle surface which is supposed to achieve an improvement of the binding in synthetic resin-bonded abrasives.

For example, U.S. Pat. No. 2,527,044 describes a molten aluminum oxide and silicon carbide abrasive particle that is coated with a matte coating of fine grained metal oxide particles, for example iron III oxide or molybdenum oxide, in order to improve the bonding with synthetic resin-bonded abrasives. The metal oxide particles adhere to the surface of the particles by means of a thin glasslike layer.

U.S. Pat. No. 2,541,658 describes the sheathing of abrasive particles in metaphosphates and iron oxide pigments that are supposed to improve the bonding of the particle in the paper and linen application and, at the same time, the water resistance of the abrasives.

In addition, EP-A-0 014 236 describes the treatment of abrasive particles on the basis of aluminum oxide containing a portion of titanium oxide, with a layer of a ceramic mass, such as, for example, clays, kaolin or glass frits, being melted or sintered onto the abrasive particle. Simultaneously with the sintering or melting, there occurs a change of the titanium oxide contained in the corundum from the 3-valency to the 4-valency oxidation level which goes hand in hand with a change of the structure of the abrasive particle.

Finally, EP-B-0 080 604 describes a ceramic sheathing to improve the abrasive performance in wet grindings, with the ceramic sheathing consisting of a glass frit, a binding agent and a grinding-active fine grain.

The treatments of the particle in accordance with the patents mentioned above, in particular the treatment in accordance with U.S. Pat. No. 2,541,658, have found entry in industry in spite of their known shortcomings. Here, for cost reasons, the treatment with iron oxide pigments ($Fe_2O_3$) to enlarge the particle surface of abrasive particles for use in synthetic resin-bonded abrasives has reached particular importance. However, the disadvantage of this treatment lies in the fact that under high stress and strong heating of the particle during the abrasion operation, the adhesion of the particle in the bonding is reduced and the particle breaks out of its bonding. One explanation of this behavior may be found in the fact that the iron-III oxide is thermally broken down to iron-II oxide. The change of volume and the release of oxygen connected therewith damage the bonding with the synthetic resin and promote the particle's breaking out. The serviceable life or, respectively, the abrasion performance of the abrasive is correspondingly low.

Applying ceramic masses in accordance with EP-A-0 014 236 is limited to titanium containing corundums and, in addition, necessitates the application of high temperatures. One disadvantage is that at those temperatures, stable particle conglomerates are frequently formed that can be destroyed only with great difficulty. This lowers either the yield of abrasive particles in the desired particle-size distribution or the mixture obtained thereby must be subjected to a labor-extensive and thus costly comminution step. Also, the surface of the particles treated is in most cases increased only to a minor degree since with the high temperatures, the fine grained particles melt together with the binding agent to form a glass-like coating.

In the sheathing with an abrasion-active fine-grain particle in accordance with EP-B-0 080 604, it is difficult to fix the intended fine-grain particles firmly to the surface of the abrasive particles.

Also, the intended fine-grain particles involve abrasion-active agents that are fused with a glass frit and that are supposed to form a surface that is as smooth as possible; this means that here, too, the specific surface of the abrasive particle is enlarged only to a minor extent, The objective of the invention is to provide a sheathed abrasive particle with an enlarged surface with good and lasting bonding even under great mechanical and thermal stress, for example in synthetic resin-bonded cutting-off wheels, which therefore does not show the disadvantages of the state of the art as described. Connected therewith is a better utilization of the particle properties which documents itself, in addition to a reduced breaking-away of the particles, in a recognizable improvement of the abrasion performance.

Surprisingly, the objective strived at could be reached by first wetting abrasive particles on the basis of molten or sintered corundums, zirconitun corundums, silicon carbide and boron carbide in a mixer with 0.05-2.0 weight % with an aqueous silicon solution, preferably colloidal silicic acid, and subsequently sheathing them with 0.05-5.0 weight %, in each case relative to the mass of the starting particle, of a complex fine-grained oxide compound of the general formula $A_xB_yO_z$, with A and B each being a group of elements and O being oxygen present in a stoichiometric ratio, and the numbers x, y and z denoting the composition of the complex oxides and not being limited to whole numbers, and z corresponding to a product of the sum of (x+y) and a factor of between 1.5 and 2.5. The group of elements A concerns the group of the metals in the periodic system of elements while the group of elements B concern the group of amphoteric elements in the periodic system. The complex, fine grained oxide compound $A_xB_yO_z$ contains at least one element A from the group of the metals in the periodic system of the elements and at least one element B from the group of the amphoteric elements, as well as oxygen in the stoichiometric ratio to A and B. Depending on the heat resistance of the abrasive particle to be sheathed, a heat treatment between 100 and 900° C. is provided, following the sheathing process, to improve the adhesion of the sheathing.

In comparison with other, similarly fine-grained materials that are used in accordance with the state of the art for an enlargement of the surface and an improvement of the bonding, the positive effect of the fine-grained complex oxides used in accordance with the invention for the bonding of the abrasive particle and thus for the abrasion performance of the abrasive is considerably more pronounced which will be explained later by way of examples. One explanation of this positive effect is thus not only to be found in the enlargement of the surface area of the abrasive particles through the complex, fine-grained oxide compounds which adhere well to the surface of the particle via the silicate binder, and in the special surface structure of the particles which increases the binding forces that are mostly based on adhesion. In addition, the complex fine-grained oxide compounds of the invention are thermodynamically very stable and thus reaction resistant. During any abrasion process with high mechanical and/or thermal stress on the particle, almost no disintegration or reactions take place with the material to be abraded or the abrasive particle. The cause for that is possibly the special oxide composition between metallic and amphoteric elements. Another advantage results from the good wetting of the abrasive particle as well as of the complex oxide composition through the silicon binder, preferably through colloidal silicic acid. In conjunction with a thermal treatment of the sheathed particle adjusted to the thermal stability of the particle, this results in an optimal adhesion of the complex oxide compound.

Corundums, silicon carbides and boron carbide can be heated for an hour to up to 900° C. to fuse the sheathing, without any noteworthy change in the basic substance. An exception is eutectic zirconium corundum which disintegrates above approximately 600° C. due to an overproportionate stretching that is characteristic of this product. Therefore, this product should not be heated above 500° C. for the fusing of the sheathing. Surprisingly, it has been shown that this temperature suffices in order to guarantee the desired good adhesion of the sheathing to the particle and to obtain a clearly improved abrasion performance.

The integration of the sheathed abrasion particles and the improvement of the abrasion performance connected therewith have been tested in synthetic resin-bonded cut-off wheels. In separation tests, the individual particle was subjected to above-average stress and heat, which also put extreme stress on the interface of the particle with the synthetic resin;

it is therefore possible to show particularly clearly the efficacy of the sheathing in accordance with the invention by way of such tests.

The following is to explain the invention in detail, without this constituting any limitation.

EXAMPLES

Cutting-Off Wheel Production

FRSK Semi-Special Fused Alumina of Treibacher Schleifmittel in FEPA Particle Size F36

For every 5 cutting-off wheels, 780 g of abrasive particles were first mixed with 55 g of liquid resin (phenol resin), and this mixture was subsequently blended with 240 g of a powder mixture consisting of 50.0 weight % of phenol powder resin, 25.0 weight % of cryolite, 24.0 weight % of pyrite and 1.0 weight % of CaO. After that, a corresponding portion of the mixture was pressed into discs with a 178 mm diameter and a thickness of 2.8 mm and hardened at 180° C. for 14 hours.

Cutting-Off Wheel Production

ZK40 Eutectic Zirconium Corundum of Treibacher Schleifmittel in FEPA Particle Size F36

In contrast to the FRSK particle, in the case of ZK40, 780 g of abrasive particles is admixed with 65 g of liquid resin and 260 g of the powder mixture described above.

Test Parameters for the Separation Tests:
20 cuts/cutting-off wheel
materials: flat steel ST 37, 30x8 mm (for FRSK) round steel V2A (18% Cr, 10% Ni), 20 mm diameter (for ZK40)
time/cut: 3.5 s (FRSK) 5.5 s (ZK40)
calculation of the G factor after 20 cuts (average value of the 5 wheels) according to:

$$\frac{\text{separated area of the material}}{\text{loss of area of the cutting-off wheel}} = G \text{ factor}$$

Example 1

Comparative Example 5.0 kg of FRSK F36 semi-special fused alumina (particle size according to FEPA, Federation Europeenne des Fabricants des Produits Abrasifs) of Treibacher Schleifmittel were first wetted in the lab intensive mixer with 0.3 weight % of MAPL (50% aqueous mono-aluminum phosphate solution of Chemische Fabrik Budenheim) relative to the mass of the untreated particle and, following an additional mixing period of approximately 3 minutes, sheathed with 1.2 weight % of Bayferrox 222 (synthetic iron oxide pigment, $Fe_2O_3$ of Bayer AG) relative to the mass of the untreated particle. Following an additional mixing period of 2 minutes the sheathed particle was fired for one hour at 800°° C.

Five cutting-off wheels were manufactured in the manner described above, using the sheathed semi-special fused alumina particle, and tested on normal flat steel. The G factor that was determined can be found in Table 1 below.

Example 2

Invention 5.0 kg of FRSK F36 semi-special fused alumina were wetted with 0.2 weight % colloidal silicic acid (LUDOX HS 30 of Du Pont) and, following an additional mixing period of 3 minutes, sheathed with 0.2 weight % of titanium manganese antimony rutile (pigment PK12100 of Ferro Corp.) with an approximate composition of 10 weight % of $MnO_2$, 24 weight % of $Sb_2O_3$ and 66 weight % of $TiO_2$. Following an additional mixing period of 2 minutes the particle was fired for one hour at 800° C. and subsequently processed into cutting-off wheels.

The results of the separation tests on normal steel can be found in Table 1.

TABLE 1

| Test Examples (Cutting-Off Wheels) | G Factor |
| --- | --- |
| FRSK, F36, untreated | 11 |
| FRSK, F36, Example 1 | 13 |
| FRSK, F36, Example 2 | 16 |

The results of the separation tests show that a clear improvement of the abrasion performance can be achieved with the sheathing according to the invention, as compared to an untreated particle or, respectively, a particle treated in accordance with the state of the art.

Example 3

Comparison Example 5.0 kg of zirconium corundum ZK 40 F36 was sheathed like in Example 1 with MAPL and Bayferrox 222, and the particle was subsequently heat treated at 400° C. The product was used to produce cutting-off wheels.

The result of the separation tests on stainless steel can be found in Table 2.

Example 4

Comparison Example

In contrast with Example 3, 5.0 kg of eutectic zirconium corundum ZK 40 F36 was first wetted in the lab intensive mixer with 0.2 weight % of MAPL and, following an additional mixing period of 3 minutes, sheathed with 0.2 weight % of Bayferrox. The heat treatment of the sheathed particle occurred for one hour at 400° C.

The results of the separation tests of the cutting-off heels produced with the particle are shown in Table 2.

Example 5

Comparison Example 5.0 kg of eutectic zirconium corundum ZK 40 F36 was wetted in the lab intensive mixer with 0.2 weight % of colloidal silicic acid (Ludox H30) and, following an additional mixing period of 3 minutes, sheathed with 0.2 weight % of titanium oxide pigment. Following an additional mixing period of 2 minutes, heat treatment occurred at 400° C. The sheathed particle was used to produce cutting-off wheels in the manner described above which were then tested with regard to their abrasive properties.

The test results are shown in Table 2.

Example 6

Invention 5.0 kg of eutectic zirconium corundum ZK 40 F36 was first wetted with colloidal silicic acid as in Example 2 and subsequently sheathed with titanium manganese antimony rutile. The heat treatment occurred for one hour at 400° C. Production of the cutting-off wheel occurred in the manner described above.

The results of the separation tests are shown in Table 2.

Example 7

Invention 5.0 kg of eutectic zirconium corundum ZK 40 F36 was first wetted with 0.2 weight % of colloidal silicic acid in the lab intensive mixer and, following an additional mixing period of 3 minutes, sheathed with a chromium iron manganese nickel mixed oxide (D 24148 black pigment of Degussa). Following an additional mixing period of 2 minutes, the sheathed particle was heat treated at 400° C. for one hour and then processed into cutting-off wheels.

The results of the separation tests are shown in Table 2.

TABLE 2

| Test Example (Cutting-off Wheel) | G Factor |
| --- | --- |
| ZK 40 F36, untreated | 18.5 |
| ZK 40 F36, Example 3 (comparison) | 18.0 |
| ZK 40 F36, Example 4 (comparison) | 19.0 |
| ZK 40 F36, Example 5 (comparison) | 22.5 |
| ZK 40 F36, Example 6 (invention) | 27.4 |
| ZK 40 F36, Example 7 (invention) | 26.8 |

The results I Table 2 show that in abrasive cutting, a clear improvement can be achieved with the sheathed eutectic zirconium corundum in accordance with the invention as compared to an untreated zirconium corundum abrasive particle or one treated in the traditional manner.

The invention claimed is:

1. Abrasive particles of composition selected from the group consisting of fused or sintered corundums, zirconium corundums, silicon carbides and boron carbide and mixtures thereof;

the abrasive particles having a sheathing comprising 0.05 -2.0 weight % of an aqueous binding agent and a 0.05 -5.0 weight % of a complex oxide relative to the mass of the untreated particles;

wherein the complex oxide comprises $A_xB_yO_z$ where A and B are different elements and x and y are greater than zero, and z corresponding to a product of the sum of (x+y) multiplied by a factor between 1.5 and 2.5;

the sheath coatings of the particles affording enhanced surface area to the underlying substrate particles and being thermodynamically stable and highly adherent, thus effecting enhanced abrasion performance of the particles.

2. The abrasive particles of claim 1, wherein said silicate comprises colloidal silicic acid.

3. The abrasive particles of claim 1, wherein element A is a metal as characterized in the periodic system of elements.

4. The abrasive particles of claim 3, wherein the complex oxide contains at least one element from the group of metals in the periodic system of elements.

5. The abrasive particles of claim 4, wherein the elements from the group of metals are selected from the group consisting of titanium, zirconium, iron, cobalt, nickel, and combinations thereof.

6. The abrasive particles of claim 1, wherein element B is selected from the group consisting of amphoteric elements in the periodic system of elements.

7. The abrasive particles of claim 1, wherein the complex oxide contains at least one element selected from the group consisting of amphoteric elements in the periodic system of elements.

8. The abrasive particles of claim 7, wherein the amphoteric elements are selected from the group consisting of vanadium, chromium, manganese, zinc, tin, antimony, and combinations thereof.

9. The abrasive particles of claim 1, wherein the sheathing contains 0.1 2.0 weight % of the complex oxide compound relative to the mass of the untreated particles.

10. The abrasive particles of claim 1, wherein the binding agent amounts to 0.1-1.0 weight % relative to the mass of the untreated particles.

11. Synthetic, resin-bound, abrasive products comprising the abrasive particles of claim 1.

12. A method for the treatment of abrasive particles of composition selected from the group consisting of fused or sintered corundums, zirconium corundums, silicon carbides, and boron carbide, and mixtures thereof, comprising the steps of:

i. wetting the abrasive particles in a mixer with 0.05 -2.0 weight % of a liquid silicate binding agent relative to the mass of the starting particles;

ii. admixing the wetted abrasive particles with 0.05 -5.0 weight %, relative to the mass of the starting particles, of fine grained complex oxide comprising $A_xB_yO_z$, until the complex oxide is substantially evenly distributed over the surface of the abrasive particles to form sheaths thereon, wherein A and B are different elements, x and y are greater than zero, and z corresponds to a product of the sum of (x+y) multiplied by a factor between 1.5 and 2.5; and iii. heating the sheated abrasive particles to enhance adhesion of the sheathing.

13. The method of claim 12, wherein the mixing periods in steps i) and ii) each amount to 0.5 and 5 minutes.

14. The method of claim 12, wherein the heating is carried out at temperatures between 100 and 900° C.

\* \* \* \* \*